United States Patent [19]

Müller et al.

[11] 3,930,102

[45] Dec. 30, 1975

[54] ADHESIVE SHEETS AND WEBS AND PROCESS FOR THEIR MANUFACTURE

[75] Inventors: Heinz Müller, Hamburg; Bodo Szonn, Pinneberg, both of Germany

[73] Assignee: Beiersdorf Aktiengesellschaft, Hamburg, Germany

[22] Filed: Apr. 11, 1974

[21] Appl. No.: 460,246

[30] Foreign Application Priority Data

Apr. 19, 1973 Germany............................ 2320197

[52] U.S. Cl. ............ 428/354; 156/331; 260/77.5 SS; 260/77.5 AB; 428/355; 428/424; 428/425; 428/512; 428/500
[51] Int. Cl.²...................... C09J 7/02; B32B 27/40
[58] Field of Search...... 117/76 A, 122 PA, 122 PF; 161/167, 190, 231, 233, 250; 260/77.5 SS, 75 NB, 77.5 AB, 858; 428/343, 355, 423, 424, 351, 354

[56] References Cited
UNITED STATES PATENTS

| | | | |
|---|---|---|---|
| 2,929,800 | 3/1960 | Hill............................ | 260/77.5 AM |
| 3,119,792 | 1/1964 | Schultheis et al............. | 260/2.5 AB |
| 3,168,497 | 2/1965 | Twitchett..................... | 260/77.5 AB |
| 3,259,507 | 7/1966 | Smith........................... | 117/76 A |
| 3,437,622 | 4/1969 | Dahl............................ | 260/24 |
| 3,482,683 | 12/1969 | Desnoyers..................... | 161/167 |
| 3,642,044 | 2/1972 | Fertig........................... | 260/2.5 AB |
| 3,684,639 | 8/1972 | Keberle et al................. | 161/87 |
| 3,695,918 | 10/1972 | Ward........................... | 117/76 A X |
| 3,767,040 | 10/1973 | Tushaus....................... | 161/167 |
| 3,773,857 | 11/1973 | Kondo et al................... | 260/859 R |

*Primary Examiner*—George F. Lesmes
*Assistant Examiner*—Alan T. McDonald
*Attorney, Agent, or Firm*—Jordan B. Bierman; Linda G. Bierman; Kenneth J. Stempler

[57] ABSTRACT

Self-adhesive webs or sheets are disclosed which are age-resistant and are easily removed, even after long periods of application and after high temperature exposure. They are prepared by coating a base with a reactive mixture of a branched polyether having terminal hydroxyl groups, an aliphatic diisocyanate, an organometallic catalyst and an aging preventative, and heating the thus-coated base.

6 Claims, No Drawings

ADHESIVE SHEETS AND WEBS AND PROCESS FOR THEIR MANUFACTURE

This invention relates to a method for preparing sheets or webs with a polyurethane-based, self-adhesive coat which are particularly useful as labels and tapes. Many self-adhesive labels and tapes are known in the art. Most consist of a flexible, thin base, such as paper, plastic sheet, and woven or non-woven fabric, which is provided with a pressure-sensitive adhesive coat based on natural and/or synthetic rubber, resin or polymeric acrylic esters. Such adhesive coats form a firm bond with the surface of an object to which they have been applied, so that the label or tape is difficult to remove, especially after long periods of time.

For example, paper labels may split when attempts are made to remove them, and will remain partly on the surface of the object along with the self-adhesive material. Thus, adhesive and paper remnants must be scraped off or a solvent must be used. Such products are not suitable for temporary application where it is desirable to remove them at a later time.

Self-adhesive labels and tapes are also known whose initial adhesive power is relatively low but which do not meet the requirement for complete removal, because they are coated with similar types of adhesives whose bonding properties are not constant with respect to time. The elastomeric skeleton of the adhesive materials is subject to an aging process, which leads primarily to hardening of the material. Metallic surfaces, for example, accelerate this process considerably by catalytic influence. Such labels and tapes are additionally unsuitable for fastening to plastics that contain plasticizers, since plasticizer migrates into the adhesive materials rendering them useless.

Another disadvantage of known self-adhesive materials, or some of their components, for labels, tapes, and the like is their thermoplasticity and resulting flowing behavior. A reversible characterizing or covering of the surface of objects which must be stored or used at higher temperatures is not possible for this reason.

The object of the invention is to provide webs or sheets with a self-adhesive coat, and a method for their manufacture. These webs or sheets are particularly suitable for the production of adhesive labels. They have none of the above-mentioned disadvantages, and can be completely and effortlessly removed from objects on which they are fastened, even after a long storage time. They leave no remnants and do not damage the surface of the objects in any way.

The self-adhesive material and labels produced from them also have improved bonding power even after long storage and application at high temperatures.

The method according to the invention is characterized in that a reactive mixture of 74 to 84 parts by weight of a branched polyether having terminal hydroxyl groups which is produced from propylene oxide and trimethylol propane, with a mean molecular weight of about 3000 and a hydroxyl number of about 56; 17.8 to 19 parts by weight of an aliphatic diisocyanate with an average of about 36 carbon atoms, an equivalent weight of about 300, and an isocyanate content of about 14%; 0.5 to 2.0 parts by weight of an aging preventive; 0.3 to 0.7 parts by weight of a organometallic catalyst; and if necessary additions of resins and/or fillers, are applied to a base, and reacted by heat treatment to form a self-adhesive material.

The amounts of the components forming the polyurethane are preferably selected so that the isocyanate groups are present in a stoichiometric amount of about 20 to 25% less than that of the hydroxyl groups. The reaction product thus obtained is a pressure-sensitive adhesive material with the desired degree of adhesion and good cohesion. It can be completely removed from surfaces to which it might be applied.

The adhesive power values of the pure polyurethane are preferably in the range of 30 to 70 p/cm. Dependng on the intended use, the adhesive properties can be changed by adding resins (to increase the adhesive power) and/or fillers such as titanium dioxide, silica, litopones, glass threads and other commonly known fillers (to increase cohesion) without impairing the reversible adhesive behavior.

The labels or tapes produced from the self-adhesive material according to the invention can be removed completely from the various objects even after prolonged adhesion at higher temperatures (40° to 70°C). Bonds are maintained at round and straight edges without any detachment, even after prolonged storage at temperatures of up to 70°C.

The method for producing the self-adhesive material of the present invention is described as follows:

Polyether and diisocyanate (which is preferably relatively insensitive to water) are mixed homogeneously by addition of a catalyst, an aging preventative and a resin and/or filler, if desired, shortly before brushing on the base material with a conventional coating system known in the art. A thickness of about 20 to 50 g/m² is applied. The coated material is subsequently conducted through a drying duct. Residence times of about 3 minutes at about 80°C are generally sufficient to carry out the polyaddition reaction.

Suitable catalysts for the reaction are organometallic compounds, such as tin(II)-ethyl hexoate, Fe(III)-acetylacetonate, tin-naphthenate or dibutyl-tin-dilaurate. As aging preventatives, which prevent yellowing and decomposition of polyurethane at higher temperatures or from the action of high energy rays typically, bis-(2-tertiary butyl-4-methyl-6-hydroxy-phenyl)-methane; a mixture of mercaptan benzimidazole and bis-(2-hydroxy-3-methylcyclohexyl-5-methyl-phenyl)-methane; 2,5-ditertiary amyl hydroquinone; aldol-α-naphthylamine; or their mixtures can be utilized. These are preferably used in an amount sufficient to inhibit such yellowing and decomposition.

The coated web can subsequently be wound to a roll, if desired, after covering the self-adhesive coat with an adhesive repellant material such as siliconized paper. The web can be further processed by feeding to a label punching machine or to a tape cutting machine.

The coating of the base material can also be effected by transfer instead of by direct application of the adhesive material. This is accomplished by applying the reaction mixture onto a temporary base, and after the reaction is completed, transferring it by calendering to the desired permanent base. This procedure is of advantage particularly with highly temperature-sensitive or porous base materials.

Typical bases for the self-adhesive material according to this invention are paper, non-woven fabrics, woven fabrics, or plastic films, all of which can be provided with an impregnation, an adhesive-repellent back coating, an anchoring layer for the self-adhesive material or an impermeable coat between the base and the self-adhesive material. This is particularly advantageous when an absorbent base material is used. Thus, the reaction mixture is prevented from penetrating through the base material. Particularly suitable for the production of labels is a paper which is coated on the adhesive-carrying side with polyethylene.

Preferred embodiments of this invention are described below in the Examples.

EXAMPLE 1

As a base for the self-adhesive material, a white sized paper was used which was about 65 $\mu$m thick. One side was provided with an extruded polyethylene coating of about 30 $\mu$m thickness, which had been corona-treated. The compound product of paper and polyethylene coat weighed about 96 g/m².

The corona-treated polyethylene coat of the base was laminated with the reactive mixture of the following composition in an amount corresponding to about 45 g/m² in the two-component method without solvent:

COMPONENT A 78.4 parts by weight of a branched polyether having terminal hydroxyl groups with a molecular weight of about 3000 ± 200 and a hydroxyl number of about 56 ± 3. The water content of the polyether was about 0.1%. (Desmophen 3400, Bayer AG).

2.0 parts by weight of an aging preventative (2,5-ditertiary amyl hydroquinone)

0.6 parts by weight of a organometallic catalyst (tin-(II)-octoate).

COMPONENT B 19.0 parts by weight of a long-chained, aliphatic diisocyanate with an average of about 36 carbon atoms, an equivalent weight of about 300 and an isocyanate content of about 14%. (Dimeryldiisocyanat 1410, Schering AG).

The coating of the base was effected continuously. The components A and B were conveyed with a two-component dosing unit, mixed continuously and homogeneously, and applied to the base.

The base laminated with the reactive mixture was subjected to heating for 3 minutes at a temperature of about 80°C. in the drying duct of a coating unit suitable for large-surface coating of base materials. Infrared spectroscopy revealed no free isocyanate groups in the self-adhesive material thus produced.

An excellent self-adhesive material with an adhesive power of about 40 p/cm was obtained from which labels were produced by means of a label punching machine. The labels maintained their full self-adhesive properties even after prolonged storage. They were pasted on metal and plastic objects and could be removed after a long time without any parts remaining on the respective objects.

EXAMPLE 2

According to the procedure of Example 1 a reactive mixture of the components A and B described below was applied and reacted on a compound product of paper and polyethylene coat.

COMPONENT A 8.1 parts by weight of a branched polyether having terminal hydroxyl groups with a mean molecular weight of about 3000 and a hydroxyl number of about 56; (Desmophen 3400, Bayer AG) 0.7 parts by weight of an aging preventative (bis-(2-tertiarybutyl-4-methyl-6-hydroxy-phenyl)-methane);

0.5 parts by weight of an organometallic catalyst (dibutyl-tin-dilaurate).

COMPONENT B 17.8 parts by weight of a long-chained, aliphatic diisocyanate having about 36 carbon atoms. The equivalent weight of diisocyanate was about 300 and the isocyanate content was about 14%. (Dimeryldiisocyanat 1410, Schering AG).

The adhesive power of a coat of 20 to 30 g/m² was found to be about 40 p/cm.

EXAMPLE 3

On a black-pigmented polyethylene film of 100 $\mu$ thickness, which was corona-treated on one side, the following reactive mixture was applied on the corona-treated side in the same manner as described in Example 1, and made to react in situ by heat treatment.

COMPONENT A 79.0 parts by weight of a branched polyether having terminal hydroxyl groups, a molecular weight of about 3000 ± 200 and a hydroxyl number of about 56; (Desmophen 3400, Bayer AG);

2.0 parts by weight of an aging preventative (2,5-ditertiary amyl hydroquinone);

0.3 parts by weight of an organometallic catalyst (Fe(III)-acetylacetonate);

16.0 parts by weight of a terpene-phenol resin with a melting range of about 118° to 120°C. (SP 55g, Fa. Schenectady).

COMPONENT B 18.7 parts by weight of a long-chained, aliphatic diisocyanate with an average of about 36 carbon atoms, an equivalent weight of about 300, and an isocyanate content of about 14%. (Dimeryldiisocyanat 1410, Schering AG).

Aging preventative, catalyst, and resin had been dissolved at a temperature of about 100° in the polyether before the two components were mixed.

The adhesive power was measured for a coating of about 20 to 30 g/cm², and was found to be about 95 p/cm.

EXAMPLE 4

On a transparent polyester film of 25 $\mu$ thickness, on which a coat of polyvinyl chloride had been applied in a thickness of about 5 g/cm², a reactive mixture was laminated to the side of the film provided with polyvinyl chloride in accordance with Example 1, and reacted. The mixture comprised:

COMPONENT A 78.5 parts by weight of a branched polyether having terminal hydroxyl groups, a molecular weight of about 3000 ± 200 and a hydroxyl number of about 56; (Desmophen 3400, Bayer AG);

2.0 parts by weight of an aging preventative (aldol-$\alpha$-naphthylamine);

0.7 parts by weight of a organometallic catalyst (tin-naphthenate);

15.5 parts by weight of a terpene-phenol resin with a melting range of 118° to 120°C. (SP 55g, Schenectady);

19.0 parts by weight of an inorganic pigment (e.g titanium dioxide).

COMPONENT B 18.8 parts by weight of a long-chained, aliphatic diisocyanate with an average of 36 carbon atoms, an equivalent weight of about 300, and an isocyanate content of about 14%. (Dimeryldiisocyanat 1410, Schering AG).

Aging preventative, catalyst and resin were dissolved at about 100°C in the polyether and subsequently the inorganic pigment was dispersed into the mixture on a three-roll mill.

The adhesive power was about 95 p/cm for a coat about 20 to 32 g/m² thick.

EXAMPLE 5

To an unbleached sized, slightly creped paper, which had been impregnated and provided on one side with an adhesive-repellant varnish, was applied the following reactive mixture in the same manner as described in Example 1 and reacted by heat treatment:

COMPONENT A 78.5 parts by weight of a branched polyether having terminal hydroxyl groups, with a molecular weight of about 3000 ± 200 and a hydroxyl number of about 56; (Desmophen 3400, Bayer AG).

2.0 parts by weight of an aging preventative (a mixture of mercaptan benzimidazole and bis-(2-hydroxy-3-methylcyclohexyl-5-methylphenyl)-methane);

14.0 parts by weight of a terpene-phenol resin with a melting range of 118° to 120°C; (Sp 55g, Schenectady);

11.0 parts by weight of a terpene-phenol resin with a melting range of 78° to 82°C; (Alvesen 191, Chem. Werke Albert);

0.5 parts by weight of an organometallic catalyst (Fe-(III-acetylacetonate).

COMPONENT B 19.0 parts by weight of a long-chained aliphatic diisocyanate with an average of 36 carbon atoms, an equivalent weight of about 300 and an isocyanate content of about 14%. (Dimeryldiisocyanat 1410, Schering AG).

The adhesive power was measured at about 100 p/cm for a coat of about 40 to 50 g/m². By "adhesive power" is meant the force necessary to remove a strip 1 cm. wide from a polished steel bar onto which the strip was rolled 10 times with a 2kp roll. The force is measured when the strip is removed at an angle 180° to the bar at a rate of 300 mm/min.

Since the two components A and B are present in the liquid state and are easily pumpable, the use of expensive and hazardous solvents and diluents is unnecessary.

Heating of the reaction mixture applied to the base can be effected primarily at temperatures in the range of 50° to 90°C. The viscosity-increasing reaction of the two components A and B to a polyurethane is accelerated particularly at temperatures above 60°C. Preferred temperatures are in the range of 60° to 80°C. The heating time is about 1 to 10 minutes, depending on the temperature applied and on the type and thickness of the coat. A heating time of 3 minutes at a temperature of about 80°C yielded good results.

It has also been found that an intermediate coat of an alkyd resin, such as a commercial alkyd resin primer, applied to a base, such as paper with a polyethylene coat, is especially useful.

The pressure-sensitive self-adhesive material applied according to this invention represents an incompletely crosslinked, elastic polyether urethane with self-adhesive properties. The aging preventative incorporated in the polyetherurethane prevents to a great extent yellowing and decomposition from exposure to high temperatures and high energy rays normally caused in polyurethane.

Processing the self-adhesive material provided according to the invention is relatively easy because of the particular diisocyanates since they show far less reactivity to water than to hydroxyl groups. Thus, satisfactory production of the products according to the method of the invention is ensured even in mass production with varying atmospheric humidity.

What is claimed is:

1. A self-adhesive web or sheet material, which comprises a base sheet which is laminated with a polyurethane-based, self-adhesive coat, said coat having been produced by heating a mixture comprising 74 to 84 parts by weight of a branched polyether having terminal hydroxyl groups produced from propylene oxide and trimethylol propane, with a mean molecular weight of about 3000 and a hydroxyl number of about 56;

17.8 to 19 parts by weight of an aliphatic diisocyanate with an average of about 36 carbon atoms, an equivalent weight of about 300, and an isocyanate content of about 14%; and 0.3 to 0.7 parts by weight of an organometallic catalyst.

2. The material according to claim 1 wherein the mixture further comprises 0.5 to 2.0 parts by weight of an aging preventative.

3. The material of claim 1 in which the mixture further comprises a resin to increase the adhesive power of the self-adhesive coat.

4. The material of claim 1 in which the mixture further comprises a filler.

5. The material of claim 1 in which the base sheet comprises polyethylene-coated paper and the self-adhesive coat is applied to the surface of the polyethylene.

6. The material of claim 1 in which the base sheet comprises polyethylene-coated paper, having a coat of an alkyd resin on the polyethylene surface, and the self-adhesive coat is applied to the alkyd resin coat.

* * * * *